United States Patent
Gilchrist

(10) Patent No.: US 7,294,829 B2
(45) Date of Patent: Nov. 13, 2007

(54) METHOD AND APPARATUS FOR AN IMPROVED FORMATION DENSITY INDICATOR USING PULSED NEUTRON INSTRUMENTS

(75) Inventor: W. Allen Gilchrist, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 162 days.

(21) Appl. No.: 11/115,792

(22) Filed: Apr. 27, 2005

(65) Prior Publication Data

US 2006/0243898 A1 Nov. 2, 2006

(51) Int. Cl.
*G01V 5/10* (2006.01)
(52) U.S. Cl. .................... 250/269.7; 250/266
(58) Field of Classification Search ............. 250/269.7, 250/266
See application file for complete search history.

(56) References Cited

U.S. PATENT DOCUMENTS

| | | | |
|---|---|---|---|
| 5,390,115 A * | 2/1995 | Case et al. ..................... 702/8 |
| 5,525,797 A | 6/1996 | Moake ..................... 250/269.3 |
| 5,767,510 A | 6/1998 | Evans ..................... 250/269.1 |
| 5,825,024 A * | 10/1998 | Badruzzaman ........... 250/269.6 |
| 5,841,135 A * | 11/1998 | Stoller et al. ............. 250/269.3 |
| 5,900,627 A | 5/1999 | Odom et al. ............. 250/269.7 |
| 6,064,063 A | 5/2000 | Mickael ..................... 250/269.7 |
| 6,124,590 A | 9/2000 | Mickael ..................... 250/264 |
| 2002/0190198 A1 | 12/2002 | Mickael ..................... 250/269.3 |
| 2003/0178560 A1 | 9/2003 | Odom et al. .............. 250/269.2 |
| 2004/0222368 A1 | 11/2004 | Odom et al. .............. 250/269.2 |
| 2005/0067563 A1 | 3/2005 | Gilchrist et al. .......... 250/269.7 |
| 2005/0189483 A1 | 9/2005 | Sale ........................ 250/269.3 |

OTHER PUBLICATIONS

A. Badruzzaman et al., "Multi-Sensor Through-Casing Density and Saturation Measurement Concepts With a Pulsed Neutron Source: A Modeling Assessment." SPE 89884, 2004 SPE International Petroleum Conference, Puebla, Mexico, Nov. 8-9, 2004, Society of Petroleum Engineers.*
A Badruzzaman et al., "Progress and Future of Pulsed Neutron Technology in Oil Field Management." SPE 49228, 1998 SPE Annual Technical Conference and Exhibition, New Orleans, Louisiana, Sep. 27-30, 1998, Society of Petroleum Engineers.*
Richard C. Odom et al.; *Shaly Sand Analysis using Density-Neutron Porosities from a Cased-hole Pulsed Neutron System*, SPE 55641, 1999 SPE Rocky Mountain Regional Meeting, May 15-18, 1999, pp. 1-10, 10 Figs.
Richard C. Odom et al.; *Log Examples with a Prototype Three-Detector Pulsed-Neutron System for Measurement of Cased-Hole Neutron and Density Porosities*, SPE 71042, SPE Rocky Mountain Petroleum Technology Conference, May 21-23, 2001, pp. 1-10, 7 Figs.

* cited by examiner

*Primary Examiner*—Constantine Hannaher
(74) *Attorney, Agent, or Firm*—Madan, Mossman & Sriram, P.C.

(57) ABSTRACT

A pulsed neutron source is used in a density logging tool with three or more detectors. This enables compensation for source variations and provides redundant measurements that are used to make borehole corrections and/or corrections for casing.

19 Claims, 4 Drawing Sheets

METHOD AND APPARATUS FOR AN IMPROVED FORMATION DENSITY INDICATOR USING PULSED NEUTRON INSTRUMENTS

BACKGROUND OF THE INVENTION

This invention relates generally to oil and gas well logging tools. More particularly, this invention relates tools for measuring rock formation density through the use of gamma rays generated by a pulsed neutron source. This invention relates to an improved density tool that may be used in cased holes as well as open holes.

In petroleum and hydrocarbon production, it is desirable to know the porosity of the subterranean formation which contains the hydrocarbon reserves. Knowledge of porosity is essential in calculating the oil saturation and thus the volume of oil in-place within the reservoir. Knowledge of porosity is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. A variety of tools exist which allow the density of the reservoir to be determined. Most of these tools are effective in determining the density (and hence porosity) of the reservoir when the wellbore in which the tool is run is an uncased reservoir and the tool is able to contact the subterranean medium itself. However, once a well has been cased, there exists a layer of steel and concrete between the interior of the wellbore where the tool is located and the formation itself. The well casing makes it difficult for signals to pass between the tool and the reservoir and vice-versa. In addition, the cement can confuse the measurement of formation properties.

Devices have been proposed which would use a chemical radioactive source to generate a response signal, similar to the open-hole counterparts, which are commercially available. A chemical radioactive source tool would have a limited response due to the more complex borehole environment that generally exists in cased wells, and parameters such as the depth-of-investigation would be limited. The count rates would also be low due to the impedance introduced by the well casing. Increasing the strength of the radioactive source would not be desirable because of the safety concerns of using a strong radioactive source. Contamination problems also become a concern when using strong radioactive sources. Additionally, a large number of cased wells contain tubing within the casing. Because of the inability to contact the tool with the side of the wellbore in a wellbore containing tubing, even the chemical radioactive source tools would not work in this situation since the emitted particles will seek a path of low density and therefore migrate into the annulus between the side of the wellbore and the tubing.

A different approach involves detection of gamma radiation produced in the formation in response to a high-energy neutron source, referred to as induced gamma ray logging. When the neutron source is pulsed, gamma rays are produced by one of two reactions. The first is inelastic scattering of fast neutrons (neutrons with energies above of about one MeV or within about one order of magnitude). The second mechanism is from capture of epithermal neutrons (neutrons with an energy of about one eV). The third is from capture of thermal neutrons (neutrons with an energy of about 0.025 eV). The fast-neutron lifetimes are very small (a few microseconds) such that during the source pulse a mixed-energy neutron field exists. Shortly after the burst, all neutrons slow down to a thermal energy level and these thermal neutrons wander about until being captured, with a lifetime in the hundreds of microseconds. Gamma rays from inelastic scattering are produced in close proximity to the accelerator, and gamma rays from thermal capture are dispersed farther from the accelerator (up to tens of centimeters). The number of capture gamma rays is strongly influenced by the amount of hydrogen and the thermal neutron capture cross section of the formation. The number of gamma rays produced from inelastic scattering is less dependent on these quantities, and a measurement of such gamma rays is more directly related to the formation density. Use of a pulsed neutron source allows capture gamma rays to be separated from inelastic gamma rays, giving a better estimate of density. Examples of pulsed neutron sources are given in U.S. Pat. No. 5,900,627 to Odom et al. and U.S. Pat. No. 5,825,024 to Badruzzaman.

Formation density measurements have traditionally been made using two gamma ray detectors. In open hole situations, density estimates $\rho_{SS}$ and $\rho_{LS}$ made by the near and far detectors are used to get a corrected density estimate using the spine and rib method which may be represented by the equation $$\rho - \rho_{LS} = \Delta\rho = f(\rho_{LS} - \rho_{SS}) \qquad (1),$$

where $f(\cdot)$ is a function that is nonlinear, depends upon the standoff of the tool or the amount of mud cake between the tool and formation, and determined by a calibration process. This dual detector arrangement is able to compensate for standoff (in MWD applications) and mudcake thickness (in wireline applications). When used with a pulsed neutron source, correction also has to be made for variations in the source intensity, so that a two detector arrangement only gives a single estimate of density based on, for example, a ratio of the outputs of the two detectors.

For measurements made in cased holes, there is an additional complication due to the presence of casing and cement. In order to probe the formation, neutrons must exit the tool, pass through the casing and cement and scatter, or be captured in the formation before the resulting gamma rays passing back through the cement and the casing to finally reenter the tool to be detected. Thus, instead of just a mudcake coffection (for open hole wireline) or a standoff correction (for MWD), a cased hole density tool must be able to correct or compensate for the cement and casing, an effect which is greater than that of the mudcake. U.S. Pat. No. 5,525,797 to Moake discloses the use of a three detector tool using a chemical gamma ray source which coffects for the effects of casing. A drawback of the Moake device is the need for a relatively high energy chemical source (a safety issue), and the fact that gamma ray intensities are measured (instead of count rates).

Badruszaman discloses an embodiment in which four detectors are used in combination with a pulsed neutron source. This would, in principle, be able to compensate for both source variations, the effect of casing and the effects of mudcake. However, the teachings of Badruzzaman are lacking in exactly how the density is determined. The present invention addresses this deficiency.

SUMMARY OF THE INVENTION

One embodiment of the invention is a method of estimating a density of a subterranean formation. The earth formation is pulsed with neutrons from within a wellbore in the earth formation. Gamma rays produced by the pulsing are detected at least three locations within the wellbore. A response signal proportional to the detected gamma rays is generated at each of the at least three locations. A density is estimated from each of at least two pairs of the response signals. An improved estimate of the formation density is obtained from the at least two density estimates. The density estimate for each pair of response signals may be obtained by comparing the two signals forming the pair. This may be done using the ratio of the two signals. A comparison with a separately derived density estimate may be used. The separately derived density estimate may be obtained from a chemical source in an open borehole, or from numerical simulation. The improved density estimate may be obtained using a spine and rib method with the two density estimates from the two pairs of signals. The detected gamma rays may be a result of inelastic scattering of neutrons.

Another embodiment of the invention is an apparatus for measuring density of a subterranean formation from within a wellbore. A non-chemical energy source is conveyed in the wellbore and produces pulsed neutrons. At least three detectors detect gamma rays produced in the formation as a result of the pulsed neutrons and produce signals in response to the detected gamma rays. A processor obtains separate density estimates from at least two pairs of the response signals, and obtains from the at least two separate density estimates an improved estimate of the formation density. The processor may determine the separate density estimates for each pair of response signals by comparing f count rates for the two signals forming the pair. A ratio of count rates may be used. A comparison with a separately derived density estimate may be used. The separately derived density estimate may be obtained using a chemical gamma ray source in an open borehole, or by numerical simulation. The improved density estimate may be obtained using a spine and rib method. The detected gamma rays may be the result of inelastic scattering of neutrons. A conveyance device such as a wireline or a drilling tubular may be used to convey the source into the borehole. The improved estimate of the formation density is substantially independent of at a casing in the wellbore, a mudcake in the wellbore, cement between in an annulus between a casing in the wellbore and a wall of the wellbore, and/or a standoff of a tool conveying the non-chemical energy source from a wall of the wellbore. At least a part of the processor is at a surface location, a downhole location, and/or a remote location.

Another embodiment of the invention is a computer readable medium for use with an apparatus for measuring density of a subterranean formation from within a wellbore. The apparatus includes a non-chemical energy source conveyed in the wellbore which produces pulsed neutrons. At least three detectors detect gamma rays produced in the formation as a result of the pulsed neutrons and produce signals in response to the detected gamma rays. The medium includes instructions that enable determination of a density estimate for each of at least two pairs of the response signals, determination, from the at least two corresponding density estimates, an improved estimate of the formation density. The medium may be a ROM, an EPROM, an EEPROM, a Flash Memory, and/or an optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
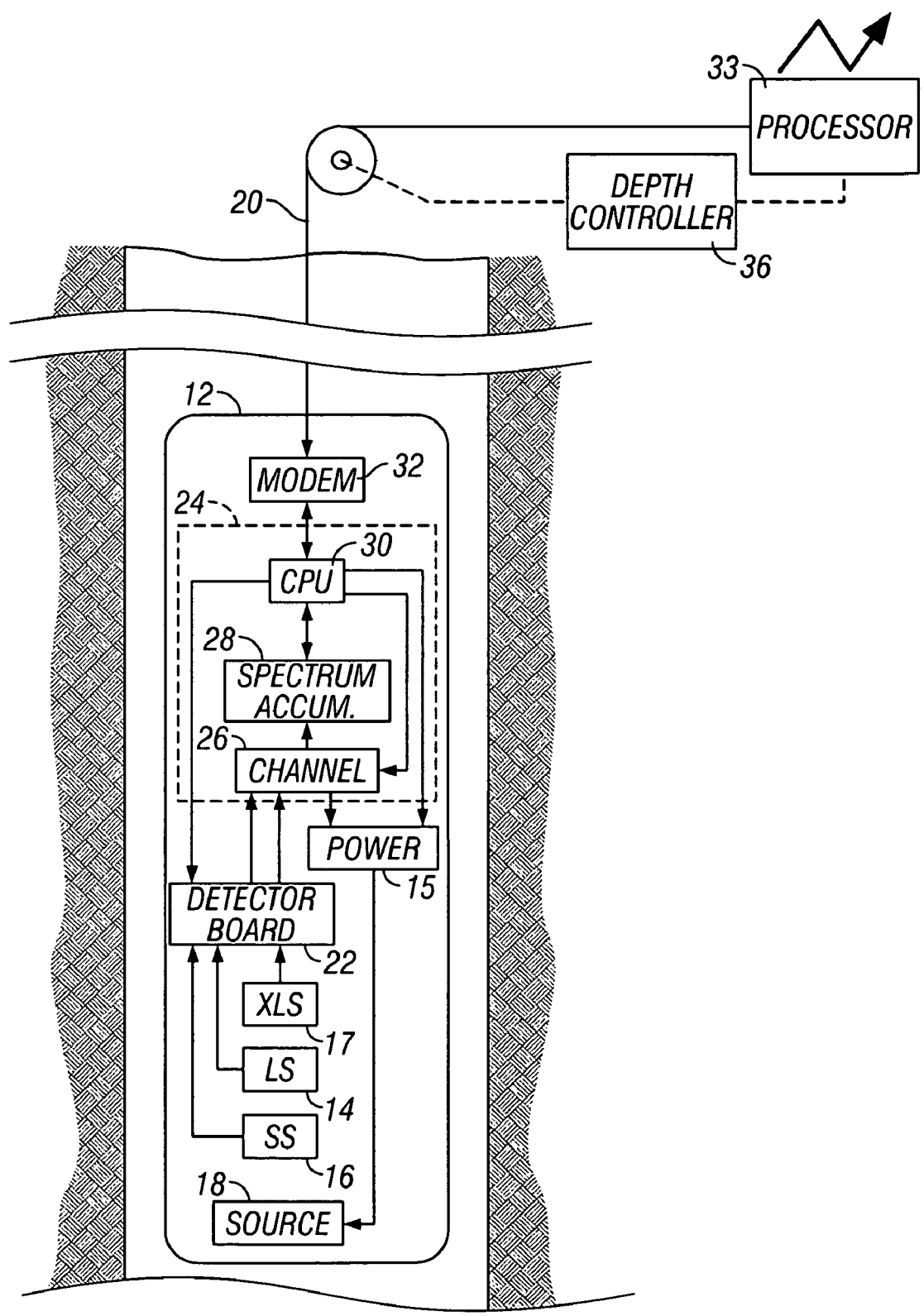
FIG. 1 (prior art) is an overall schematic diagram of the nuclear well logging system of the present invention.

The system shown in FIG. 1 is a prior art system for density logging. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes an extra-long spaced (XLS) detector 17, a long-spaced (LS) detector 14, a short-spaced (SS) detector 16 and pulsed neutron source 18. In one embodiment of the invention, XLS, LS and SS detectors 17, 14 and 16 are comprised of suitable material such as bismuth-germanate (BGO) crystals or sodium iodide (NaI) coupled to photomultiplier tubes. To protect the detector systems from the high temperatures encountered in boreholes, the detector system may be mounted in a Dewar-type flask. This particular source and flask arrangement is an example only, and should not be considered a limitation. Also, in one embodiment of the invention, source 18 comprises a pulsed neutron source using a D-T reaction wherein deuterium ions are accelerated into a tritium target, thereby generating neutrons having an energy of approximately 14 MeV. This particular type of source is for exemplary purposes only and not to be construed as a limitation. The filament current and accelerator voltage are supplied to source 18 through power supply 15. Cable 20 suspends instrument 12 in well 10 and contains the required conductors for electrically connecting instrument 12 with the surface apparatus.

The outputs from XLS, LS and SS detectors 17, 14 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller (processor) 33 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 33 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 33 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS and SS detectors 17, 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such pulse has an amplitude corresponding to an energy of at least approximately 100 KeV, the voltage pulse is transformed into a digital signal and passed to channel generator 26 of MCS section 24.

In addition, as would be known to those versed in the art, many of the functions of the components described with reference to FIG. 1 may be carried out by a processor. It should also be noted that the system described in FIG. 1 involves conveyance of the logging device into the well by a wireline. However, it is envisaged that the logging device could be part of a measurement while drilling (MWD) bottom hole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
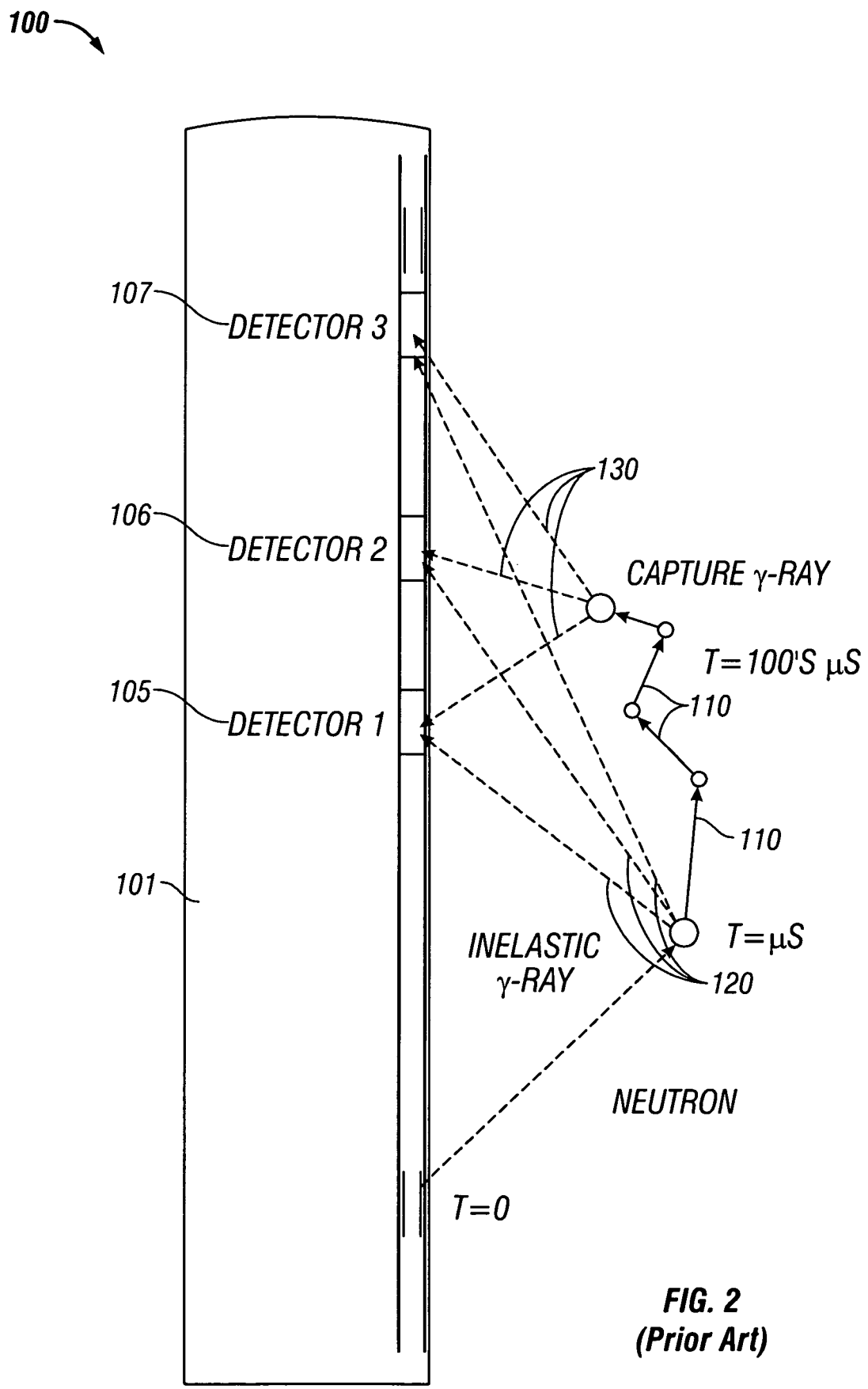
FIG. 2 (prior art) illustrates the generation of gamma rays by inelastic scattering and capture of thermal and epithermal neutrons.

FIG. 2 shows an illustration of the logging tool suitable for use with the present invention. The apparatus illustrated is that of the Reservoir Performance Monitor (RPM) of Baker Atlas, Incorporated. A measurement device 100 comprises a neutron source 101 and three axially spaced apart detectors described below. The number of detectors shown in the embodiment of FIG. 2 is only an example of the number of detectors employed in an embodiment of the present invention. It is not a limitation on the scope of the present invention. The neutron source 101 may be pulsed at different frequencies and modes for different types of measurements. The short-spaced (SS) detector 105 is closest to the source 101 The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (µs), before they lose much energy, some neutrons are involved in inelastic scattering with nuclei in the borehole and formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, the instrument pulses at 10 kHz, for example, and records full inelastic and capture gamma ray energy spectra from each detector. These data are processed to determine critical elemental ratios including carbon/oxygen and calcium/silicon from the inelastic spectra and silicon/calcium from the capture spectra. A pulsed neutron holdup imager mode yields both energy spectra and time decay spectra from each detector simultaneously. Measurements can be used to determine holdups of gas, oil, and water. When combined with other production logs, the measurements made herein can provide a comprehensive production profile picture, even in deviated or horizontal wells. A neutron activation mode provides water-flow measurements using one of several data acquisition methods. Stationary measurements are made in either of two modes, and measurements at different logging speeds can be used to segregate different flow rates in either an annulus or in an adjacent tubing string. Various spectra of count rates from these can be used either individually or in combination as needed for each measurement mode.

With the neutron generator turned off, the measurement apparatus can also be used to detect the distribution of materials, tagged with radioactive tracers, that are injected into the well during well treatments. In this manner, the effectiveness of operations such as hydraulic fracturing or gravel pack placement can be evaluated.

In an embodiment of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

After just a few µs, most of the neutrons are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few μs after the neutron generator shuts off, this process is complete. Over the next several hundred μs, thermal neutrons are captured by nuclei of various elements—again producing gammas rays, known as capture gamma rays 130. A capture gamma ray energy spectrum yields information about the relative abundances of these elements.

The method of the present invention uses the count rates from the plurality of gamma ray detectors to get an estimate of density. The method is illustrated by way of an example with reference to FIG. 3. Measurements are made 151 with the three detector logging tool illustrated in FIG. 2. The measurements may be made either in open hole or in a cased hole. Calibration is provided using results of a conventional dual detector log with a chemical gamma ray source in an open hole 153. The open-hole measurements may have been made earlier in the same well or may be obtained from a nearby offset well. In one embodiment of the invention, a ratio of counts from the SS and the LS detectors 155 of the present tool is determined and compared with the results of the calibration data. Results of such a comparison are schematically presented in FIG. 4 where the ordinate is the open-hole density and the abscissa is the ratio. This ratio may be called the first ratio $R_{12}=C_1/C_2$. The use of this ratio is discussed, for example, in Odom et al. (SPE55641) and Odom et al. (SPE71042). From the plot such as that shown in FIG. 4, a relationship between the ratio $R_{12}$ and the density ρ of the formation is obtained 157 in FIG. 3. This relationship may be denoted, for example, by the line 201 in FIG. 4. It should be noted that while the line 201 depicts a linear relationship between the ratio $R_{12}$ and density, other relationships could also be used, including a logarithmic relationship. The general form of this relationship may be given by the equation:

$$\rho_{12} = f(R_{12}) = f\left(\frac{C_1}{C_2}\right). \quad (2)$$

It should be noted that a comparison of the ratio $R_{12}$ to an open-hole log has been discussed in the two Odom references.

Figure 3:
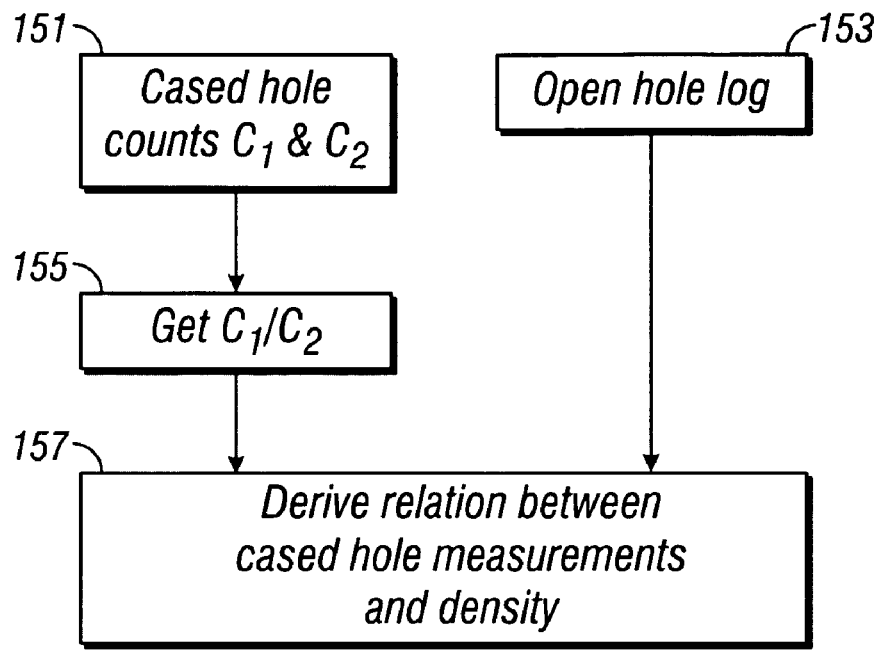
FIG. 3 is a flow chart showing the use of open-hole measurements with a chemical gamma ray source for calibrating measurements made with a pulsed neutron source.
Figure 4:
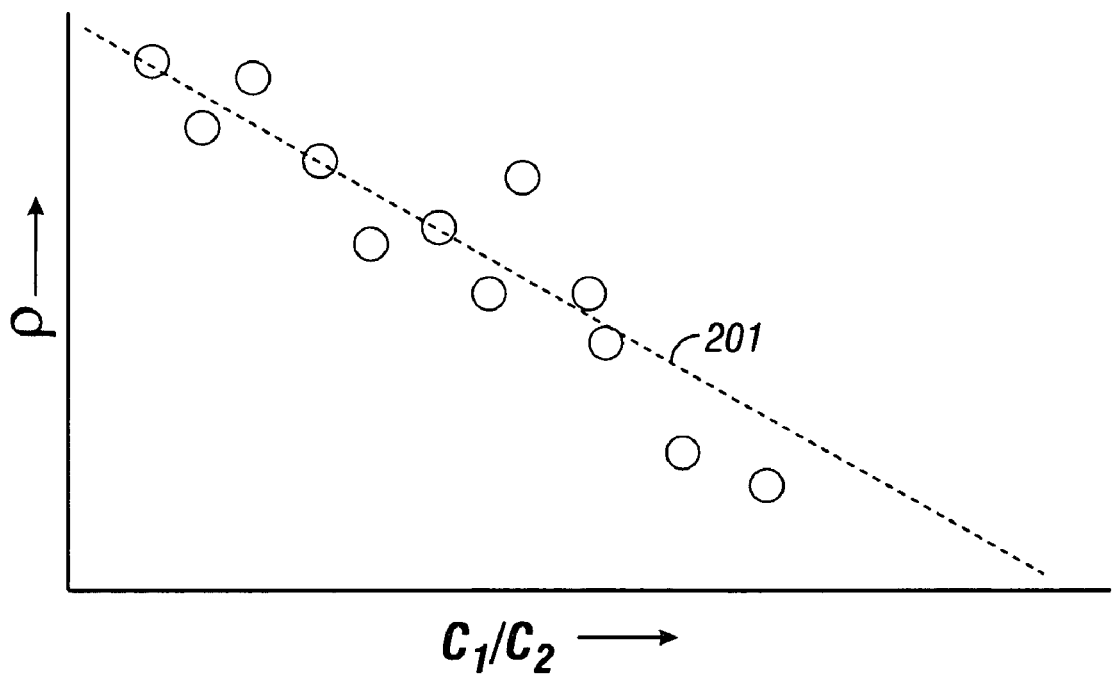
FIG. 4 depicts a possible relationship between density and the ratio of counts at two detectors for the tool of FIG. 2.

The method of the present invention is based on the recognition of the principle that when measurements of three or more detectors are used, then each pair of receivers can be used to get a density estimate using the methods described in FIGS. 3 and 4. Specifically, if three detectors are used, it is possible to get two semi-independent estimates of density with a pulsed neutron source. If four detectors are used, it is possible to get three semi-independent estimates of density with a pulsed neutron source. The two or more semi-independent estimates of density are analogous to the two density measurements obtained in open-hole logging using a chemical neutron source and two detectors (SS and LS). The manner in which these semi-independent density estimates are combined is discussed next with reference to FIG. 5.

Figure 5:
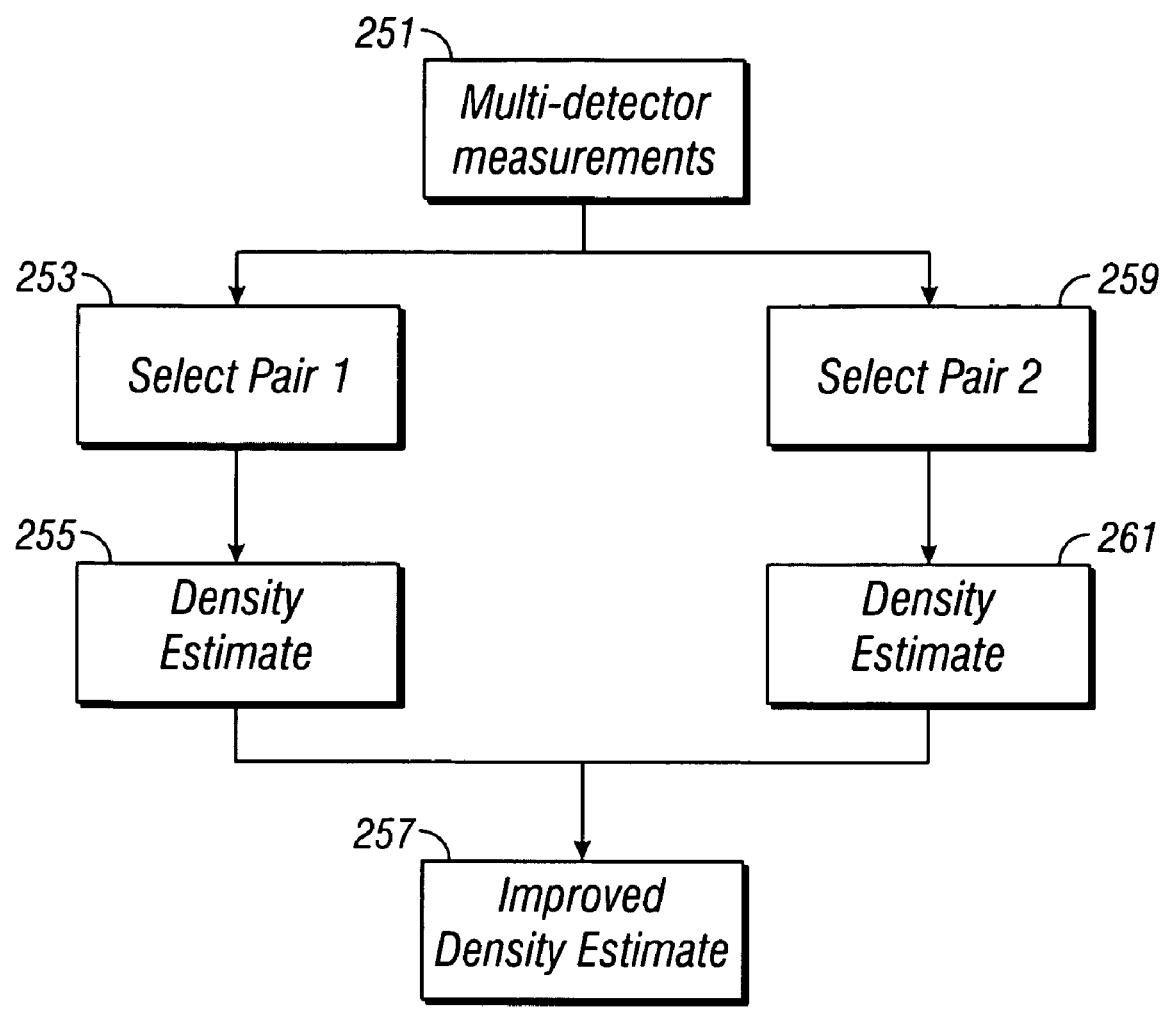
FIG. 5 is a flow chart showing the use of redundant measurements for borehole compensation and/or casing compensation.

Turning to FIG. 5, multi-detector measurements are obtained 251. A first pair of these measurements is selected 253 and using the method described above with reference to FIGS. 3 and 4, a density estimate $\rho_{12}$ is obtained 255 using eqn. (2). With a second pair of measurements 259, a second estimate of density that may be denoted by $\rho_{13}$ is obtained 261. It should be noted that the second estimate could also be obtained using $\rho_{23}$. The estimates $\rho_{12}$ and $\rho_{13}$ are then used to get 257 an improved estimate $\rho_{imp}$ using, for example, a spine and rib correction with $\rho_{12}$ and $\rho_{13}$. This makes it possible to get a borehole corrected density estimate in open hole corrected for mudcake (or MWD corrected for standoff) with a pulsed neutron source using three gamma ray detectors. The same method could also be used to get a corrected density log through casing. When four detectors are used, it may be possible to get better density estimates through casing than with three detectors. If a spine and rib type computation is done, the corrected density estimate may be given by an equation of the form:

$$\rho_{imp} - \rho_{13} = f_2(\rho_{13} - \rho_{12}) \quad (3).$$

Thus, the corrected density is a function of two ratios of counts made by three detectors. It should be noted that Odom (SPE71042) discloses the determination of two densities from two pairs of measurements, but does not teach the further step of combining the two determined densities to get a corrected density.

The processing of the data may be done by a surface or a downhole processor. In the case of MWD measurements, processing is preferably done by a downhole processor to reduce the amount of data that has to be telemetered to the surface. In any case, the relationships used for density estimation may be determined ahead of time and used by the processor. As noted above, in one embodiment of the invention, the relationships may be derived from logs made in open-hole with dual receivers and a chemical gamma ray source. The relationships may also be derived using Monte-Carlo simulation for a variety of borehole, casing and cement conditions. Such simulations have been described, for instance, in U.S. Pat. No. 6,064,063 to Mickael having the same assignee as the present invention. Calibration may also be done using laboratory measurements on core data.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of estimating a density of a subterranean formation, the method comprising:
    (a) irradiating the earth formation with a source of neutrons within a wellbore in the earth formation;
    (b) detecting, at at least three locations within the wellbore, gamma rays produced in the formation as a result of the irradiating;
    (c) for each of the at least three locations, generating a response signal from said detected gamma rays;
    (d) for each of at least two pairs of the response signals, estimating a corresponding density using a comparison of gamma ray counts; and
    (e) obtaining from the at least two density estimates an improved estimate of the formation density; and (f) storing the improved estimate of the formation density on a suitable medium.

2. The method of claim 1 wherein estimating a corresponding density from the at least two pairs of response signals further comprises determining, for each of the at least two pairs of response signals, a ratio of the two response signals forming the pair.

3. The method of claim 2 wherein estimating a corresponding density estimate for the at least two pairs of response signals further comprises comparing the ratio for each of the at least two pairs with a separately derived estimate of density.

4. The method of claim 3 wherein the separately derived estimate is obtained from at least one of (i) measurements made with a chemical source of gamma rays in an open borehole, and (ii) numerical simulations.

5. The method of claim 1 wherein obtaining the improved estimate of density further comprises using a spine and rib method.

6. The method of claim 1 wherein the detected gamma rays comprise gamma rays resulting from inelastic scattering of the neutrons.

7. The method of claim 1 wherein the irradiating further comprises pulsing a source of pulsed neutrons.

8. An apparatus for measuring density of a subterranean formation from within a wellbore, comprising:
   (a) a neutron source configured to be conveyed in the wellbore;
   (b) at least three gamma ray detectors configured to produce signals responsive to gamma rays produced in the formation as a result of radiation from the neutron source; and
   (c) a processor configured to obtain:
      (A) a density estimate for each of at least two pairs of the signals using gamma ray counts for the two signals forming each of the pairs; and
      (B) from the at least two density estimates an improved estimate of the formation density.

9. The apparatus of claim 8 wherein the processor is configured to obtain the density estimate for the at least two pairs of signals by determining, for each of the at least two pairs of signals, a ratio of the two signals forming the pair.

10. The apparatus of claim 9 wherein the processor is configured to obtain the density estimate for the at least two pairs of signals by comparing the ratio for each of the at least two pairs with a separately derived estimate of density.

11. The apparatus of claim 10 wherein the processor is further configured to obtained the separately derived estimate using at least one of (i) measurements made with a chemical source of gamma rays in an open borehole, and (ii) numerical simulations.

12. The apparatus of claim 8 wherein the processor is configured to obtain the improved estimate of density using a spine and rib method.

13. The apparatus of claim 8 wherein the detected gamma rays include gamma rays resulting from inelastic scattering of the neutrons.

14. The apparatus of claim 8 further comprising a conveyance device configured to convey the neutron source into the wellbore, the conveyance device selected from (i) a wireline, and, (ii) a drilling tubular.

15. The apparatus of claim 8 wherein the improved estimate of the formation density is substantially independent of at least one of (i) a casing in the wellbore, (ii) a mudcake in the wellbore, (iii) cement between in an annulus between a casing in the wellbore and a wall of the wellbore, and (iv) a standoff of a tool conveying the neutron source from a wall of the wellbore.

16. The apparatus of claim 8 wherein at least a part of the processor is at one of (i) a surface location, (ii) a downhole location, and (iii) a remote location.

17. The apparatus of claim 8 wherein the neutron source further comprises a source of pulsed neutrons.

18. A computer readable medium for use with an apparatus for measuring density of a subterranean formation from within a wellbore, the apparatus comprising:
   (a) neutron source configured to be conveyed in the wellbore; and
   (b) at least three gamma ray detectors configured to produce signals responsive to gamma rays produced in the formation as a result of radiation from the neutron source;

the medium including instructions that enable a processor to:
   (c) for each of at least two pairs of the response signals, obtain a density estimate using gamma ray counts for each of the two signals forming each of the pairs; and
   (d) obtain, from the at least two density estimates an improved estimate of the formation density.

19. The medium of claim 18 comprising at least one of:
   (i) a ROM, (ii) an EPROM, (iii) an EEPROM, (iv) a Flash Memory, and (v) an optical disk.

* * * * *